Figure 1:
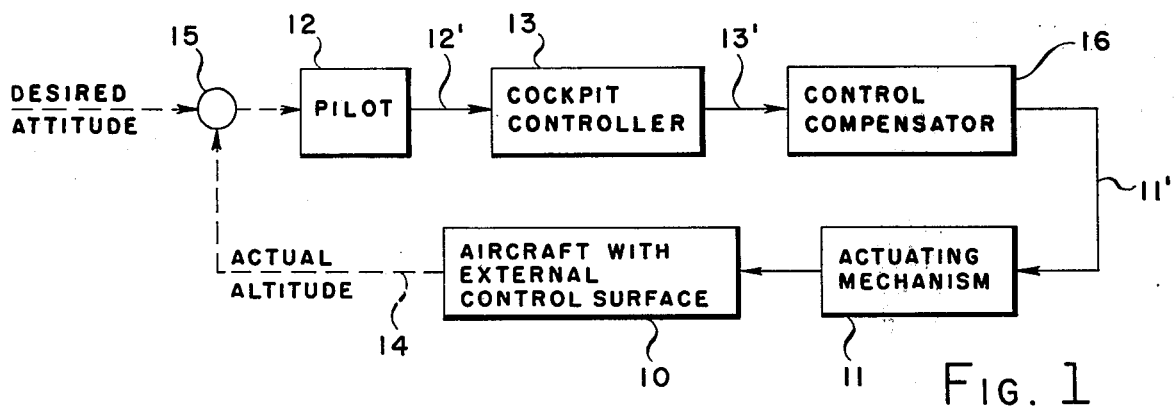

United States Patent [19]

Hart

[11] 4,071,209
[45] Jan. 31, 1978

[54] VEHICLE CONTROL SYSTEM INCORPORATING A COMPENSATOR TO STABILIZE THE INHERENT DYNAMICS THEREOF

[75] Inventor: John Evans Hart, Atlanta, Ga.
[73] Assignee: Lockheed Corporation, Burbank, Calif.
[21] Appl. No.: 716,831
[22] Filed: Aug. 23, 1976
[51] Int. Cl.² ............................................. B64C 13/04
[52] U.S. Cl. ................................. 244/83 D; 91/384; 244/83 E; 244/83 J; 318/621
[58] Field of Search .................... 244/78, 83 D, 83 R, 244/83 E, 83 G, 83 J, 85, 178, 181, 182, 193; 235/150.2; 318/621; 91/384

[56] References Cited

U.S. PATENT DOCUMENTS

| 2,496,391 | 2/1950 | Hall | 318/621 |
|---|---|---|---|
| 2,584,127 | 2/1952 | Harcum | 244/78 |
| 2,708,258 | 5/1955 | Westwood | 318/621 |
| 2,803,221 | 8/1957 | Walker | 91/384 |
| 2,903,205 | 9/1959 | Borngesser | 244/83 R |
| 3,093,121 | 6/1963 | Murphy | 91/384 |
| 3,389,639 | 6/1968 | Asche | 91/384 |

FOREIGN PATENT DOCUMENTS

| 1,009,490 | 5/1957 | Germany | 244/83 D |

Primary Examiner—Trygve M. Blix
Assistant Examiner—Reinhard J. Eisenzopf
Attorney, Agent, or Firm—Billy G. Corber; John J. Sullivan

[57] ABSTRACT

A control system is specifically designed to improve the performance of an aircraft or other vehicle having undesirable dynamic characteristics. For this purpose there is employed a compensator, either hydromechanical or electrical (hydro-electrical) depending upon the basic control system, which is incorporated into that system and modifies command inputs to the directional controls of the vehicle. This compensator is designed and preset to impose predetermined dynamic characteristics on the command inputs so as to create a resulting input which eliminates or substantially diminishes the undesirable dynamic characteristics.

10 Claims, 7 Drawing Figures

VEHICLE CONTROL SYSTEM INCORPORATING A COMPENSATOR TO STABILIZE THE INHERENT DYNAMICS THEREOF

This invention relates generally to control systems for directing the movement of vehicles, notably aircraft, having untoward dynamic characteristics and more particularly to such a system incorporating a compensator to alter the operator's manual commands and thereby stabilize the vehicle or aircraft dynamics whereby more precise control is obtained.

In recent years there has been a number of studies and experimental test programs concerned with active control configured vehicles or aircraft. The primary motivation for these activities is improvement of aircraft performance by reducing the aircraft weight and drag. One benefit derived from these studies and programs, which is increasing in importance, is the reduced fuel consumption due to the weight and drag reductions.

One of the important side effects of such programs is the reduction in the inherent stability of an aircraft. The smaller tail volumes associated with relaxed stability requirements result in significant reductions in total aircraft drag and weight without affecting payload-range. Such drag and weight reductions can be traded off against increased range, payload or time-on-station, compared to other aircraft.

While the weight reductions which have resulted are impressive, the active control system achieving them must meet the established safety criteria. Moreover, the price of the required additions to the flight control system and the costs in terms of dispatch reliability and maintenance must not be too high. The challenge then is to design an aircraft and control system to realize reduced weight and drag through relaxed static stability in a safe and cost-effective manner. The control system herein proposed incorporating a compensator operative on the pilots' command input is such a design.

In the design of aircraft, the basic considerations influencing wing location and tail surface size and location are stability requirements. The horizontal tail area, for example, is normally set to meet stability and control requirements over the desired center of gravity range of the aircraft during operation. Tail area requirements for trim or control in the landing configuration are usually dictated by the forward center of gravity limit. The aft center of gravity limit is generally determined by the minimum level of longitudinal stability.

For the relaxed stability case the horizontal tail area may be set by either the landing manuever requirement or the pitching moment required for takeoff rotation at the forward center of gravity. At the same time the level of stability or pitching acceleration required for control of external disturbances may limit at the aft center of gravity. The question is to what degree, can the stability be ? Criteria for pitch stability is changed from the easily calculated inherent stability to an unknown pitch acceleration (control power) requirement based upon the uncertain response required under varying conditions of flight and levels of atmospheric disturbance.

To obtain the desired stability characteristics with a conventional stability compensation approach, generally two types of feedback are required to modify the pitching moment with respect to angle of attack or a combination of normal acceleration and pitch rate. It is also necessary to have a relatively wide bandwidth control for a conventional pitch stability compensation system. On transport size aircraft such a system may tightly couple with basic flutter modes of the wing-nacelle-fuselage combination. This results in the safety margin criteria for flutter being a function of the variable control system loop gains for general design.

With respect to reliability requirements to ensure safety, there are several problems. There are no firm total failure probability criteria except where complete failure of the stability compensator would be catastrophic. To meet such a criteria with today's technology there is no choice but to use redundant channels. This offers one small advantage, namely that before the last channel fails the operational procedure can be to terminate the flight at the nearest suitable airport to minimize the exposure time in a non-redundant configuration.

The complexity of the multi-channel redundant system, however, introduces an economic aspect to reliability over and above the original equipment cost. In order to meet the safety probability criteria it is absolutely mandatory that all channels be fault free before take-off. This imposes a heavy burden on ground test or built-in test equipment (with its own complexity and failure modes). Regardless of how the testing is accomplished the direct maintenance cost is not insignificant and the potential for dispatch delays, and the costs resulting therefrom, is high when a number of channels of relatively low reliability are used.

Another important consideration is the requirement to ensure that no single failure or environmental condition will cause the loss of all redundant channels. The prime design approach to this requirement is to make at least one channel functionally similar but physically dissimilar. The dissimilar channel may not be required to provide performance equal to the other channel or channels but must afford safe operation of the aircraft including landing under non-ideal conditions.

The control system herein proposed with preferably a hydro-mechanical device as the stability compensator, although in specific cases an electrical or hydro-electrical device may be employed, serves to either solve or avoid the foregoing problems. The hydro-mechanical device is considered preferable because for stability compensation systems employing electrical sensing, computing and/or actuator interface equipment, the most notable single environmental event of concern is a lightning strike. In the so-called "fly-by-wire" control systems, often preferred where lightning strikes are of little or no primary concern, and the pilot's command is transmitted electrically to an electrical or hydro-electrical servomechanism to actuate the vehicle's directional control surfaces, an electrical or hydro-electrical compensator would be selected.

In any event and to satisfy the foregoing shortcomings in the existing control systems, the present invention proposes the introduction of dynamics between the pilot's cockpit controller and the position of the aerodynamic control surfaces in such a way that the pilot can easily control an aircraft that would otherwise be difficult or impossible to control. This materially differs from the prior art stability compensation systems, in which aircraft motions are sensed and the signals are fed back to the control system to cause corresponding motion of the control surfaces.

As herein contemplated a compensator is located between the pilots' controller and the source of the control forces or moments applied to the aircraft. This compensator serves to introduce dynamic characteristics such that the combination of the compensator, control force or moment sources and aircraft exhibits desirable dynamic characteristics between the pilots' controller and the aircraft's attitude. The pilot is thereby permitted to effect a high fidelity between the actual and desired attitudes without taxing his own physical and mental system.

The dynamic relation required between the output and input of the control compensator depends upon the dynamic characteristics between the aircraft's attitude and the input to the control force or moment source and on the stability of the aircraft, i.e., the degree to which the aircraft's attitude is upset by external influences such as wind conditions. From knowledge of the dynamic characteristics of the aircraft and its sources of control forces and moments and knowledge of the fixed and adaptable dynamic characteristics of human operators, standard feedback control theory is applied to establish the range of dynamics required by the control compensator such that the total combination meets the published criteria for the closed loop characteristics that results in satisfactory handling qualities. From such ranges of required control compensator dynamics for various operating points in the aircraft's flight envelope and for various configurations, such as flaps up or down, a compromise analytical design is selected (or different designs for different configurations selected) to eliminate or minimize the need for the compensator to be varied with flight condition. The range of adaptability of the pilot, while remaining within the satisfactory handling quality area, is typically accommodated by control compensators dynamic characteristics that are no higher than second order. This factor results in a low complexity for the mechanization of the control compensator.

Figure 5:
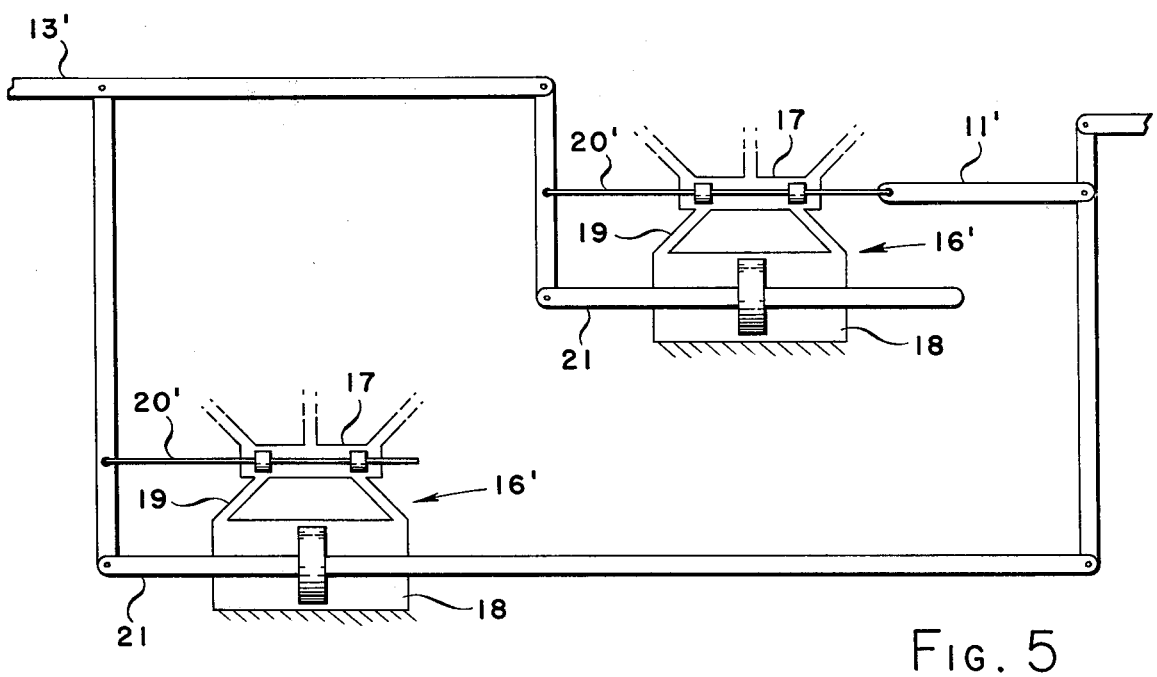
Figure 6:
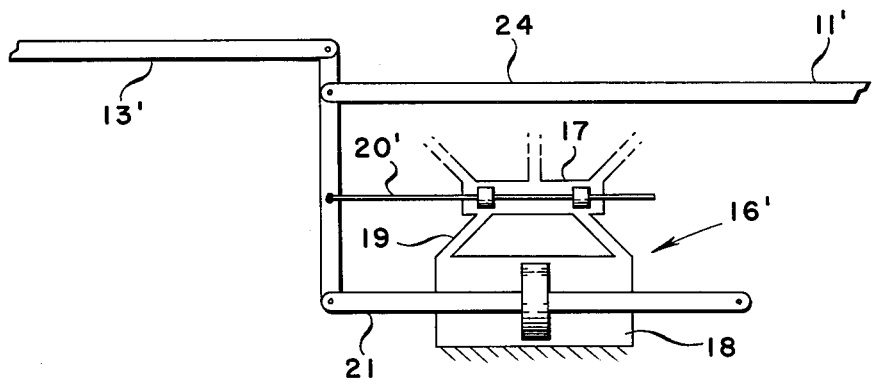
Figure 7:
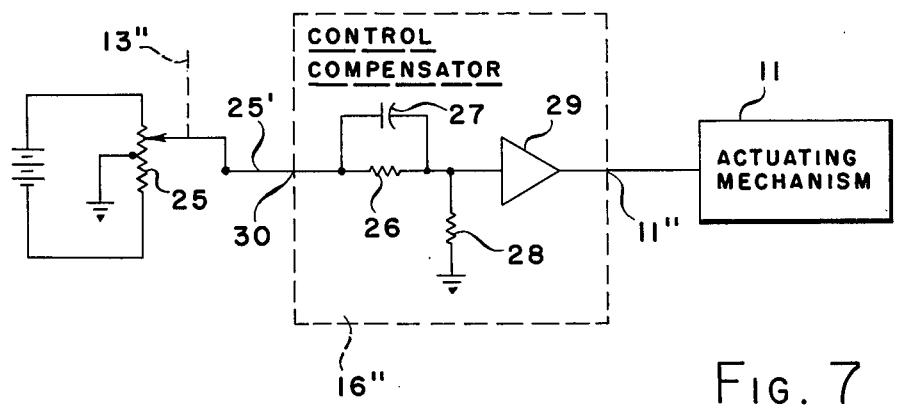

With the above and other objects in view as will be apparent this invention consists in the construction, combination and arrangement of parts all as hereinafter more clearly described, claimed and illustrated in the accompanying drawings, wherein:

FIG. 1 is a block diagram of a aircraft control system or "loop" within the purvue of this invention to show the location of the compensator incorporated therein between the pilot and the directional controls to introduce corrective inputs thereto as necessary to maintain the desired movement or aircraft flight path and attitude;

FIGS. 2 through 6 are each a schematic view of a different compensator to be used in the system of FIG. 1, each such compensator being in the form of a hydromechanical device, to show the essentials thereof and several linkage arrangements whereby a variety of dynamic characteristics between the pilots' input and the controls are obtained; and FIG. 7 is a block diagram of an alternative aircraft control system or "loop" within the purvue of this invention to show the essentials of a hydro-electrical compensator incorporated therein between the pilot and the directional controls in lieu of any of the hydromechanical devices of FIGS. 2 through 6.

Referring more particularly to the drawings, 10 designates an aircraft equipped with conventional controls such as movable external surfaces or the equivalent including a control moment source 11 in the form of an actuating mechanism therefor which may be powered. Operation of the source or mechanism 11 causes the aircraft 10 to move in the various planes or flight attitudes/directions for which it is designed. Operation of the mechanism 11 and hence steering of the aircraft 10 is under the control of a pilot 12 through an appropriate controller or stick 13, the output 13' thereof being operatively connected to the mechanism 11.

The resulting response i.e., the actual attitude of the aircraft 10 is conveyed back to the pilot 12 through appropriate means indicated simply as a path 14. This feed back through the path 14 permits the pilot to compare the aircraft's actual attitude with the desired attitude at 15. In high performance aircraft, high fidelity between the desired and the actual aircraft attitude is not possible through a direct connection. This is true even if the force levels of the pilot's controller 13 are reduced by the use of such devices as aerodynamic control surface boosters or full power servos. The problem is that the dynamics which the pilot 12 must introduce to offset the undesired dynamics of the control force or moment and aircraft combination is beyond his dynamic ability. The mental and physical workload in trying to achieve the required dynamics and the lack of fidelity in following the desired attitude result in the pilot rating the aircraft as having poor handling qualities.

This invention proposes to improve the ability of a pilot 12 to control the attitude of the aircraft 10 by the introduction of a compensator 16 between the pilot's controller 13 and the mechanism 11. The function of this control compensator 16 is to introduce dynamic characteristics such that the combination of the compensator 16, the mechanism 11 and the aircraft 10 exhibits desirable dynamic characteristics between the pilot's controller 13 and the aircraft's attitude. The pilot 12 is thereby permitted to effect a high fidelity between the actual and desired attitudes without taxing his dynamic ability.

The specific dynamic characteristics which the control compensator 16 is designed to produce depend upon the dynamic characteristics which the uncompensated aircraft 10 displays. When the aircraft's characteristics vary with the operating environment or as a result of configuration changes, the inherent dynamics of the control compensator 16 may be made to vary in concert or a compromise set of dynamics may be found which are satisfactory for the full range of configurations and environmental conditions.

It is known that the pilot 12 adapts to the dynamic characteristics of the aircraft 10 which he is controlling. The degree to which the pilot 12 must provide compensation in his adaptation is a measure of his satisfaction with the handling qualities. Mathematically, the pilot's performance, in terms of his controller output in relation to deviations of the actual vehicle response from the desired response, may be stated as a describing function.

When the dynamics of the aircraft 10 and the pilots' describing function are combined, the dynamic characteristics of the assumed series control compensator 16 may be derived through the application of feedback control system theory and appropriate criteria for the performance of the complete pilot/compensator/aircraft system.

Referring specifically to FIGS. 2 through 6 a hydromechanical compensator 16' is incorporated into the system or loop of FIG. 1 to provide the static and dynamic characteristics necessary to give acceptable handling qualities to the aircraft 10 which may otherwise have an under-damped or unstable short period response, a lack of response above the short period frequency, or other untoward dynamic characteristics.

Generally speaking, the compensator 16' comprises the combination of a linear valve 17 and a hydraulic actuator 18 interconnected as at 19. Such valve 17 and actuator 18 are connected to the pilot input 12' through the controller 13 which inputs at 13' to the compensator 16'. The resulting output 11' from the compensator 16' is operatively connected to the mechanism 11. Thus, a wide variety of dynamic characteristics between a pilot's input 12' and the mechanical output 11' is obtained.

Figure 2:
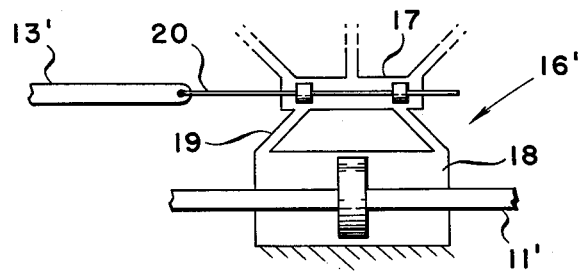
Figure 3:
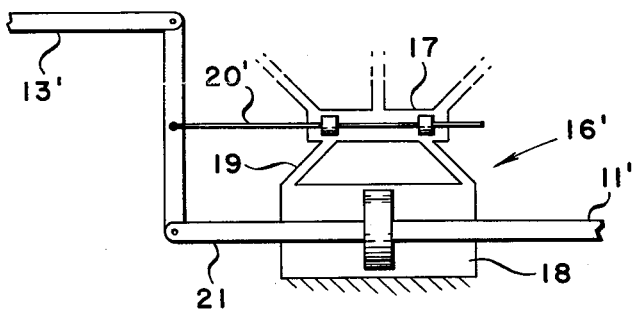
Figure 4:
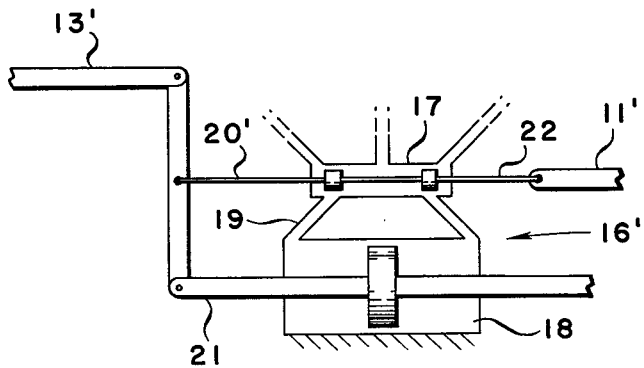

When the pilot's input 12' is connected through input 13' directly to the valve 17 alone as shown at 20 in the compensator 16' of FIG. 2 the actuator 18 position output 11' is the integral of the input 13'. When on the other hand the input 13' is simultaneously connected, as at 20' and 21, to the valve 17 and actuator 18 respectively as in the compensators 16' of FIGS. 3 and 4 the resulting output 11' is either a "lag" or a "washout". A lag occurs when the output 11' is connected directly to the actuator 18 (FIG. 3) while a "washout" occurs when the output 11' is connected directly, as at 22, to the valve 17 (FIG. 4). In the unconventional arrangement of FIG. 4 the output 11' or "washout" is primarily a function of the rate of change of the input 13' and is zero in steady state for any fixed value of the input 13'.

A "lead-lag" characteristic can be obtained by summing the output 11' of a lag (FIG. 3) and a washout (FIG. 4) with a common input 13' through connections 20' and 21 and choosing the time constants to be equal through appropriate linkage 23, as shown in the double compensator arrangement of FIG. 5. This same result may also be obtained in what may be a simpler arrangement shown in the compensator 16' of FIG. 6. In FIG. 6 an additional output link 24 is employed between the input 13' and the output 11'.

Referring specifically to FIG. 7, an electrical compensator 16" is incorporated into the system or loop of FIG. 1 as an alternative to the hydro-mechanical device of FIGS. 2 through 6. In this embodiment of the invention a voltage proportional to the force on or displacement of the pilot's controller 13 is sensed by a detector 25 and transmitted via a conductor 25' to input a signal 30 into the compensator 16".

The control compensator 16" in its simplest, preferred form consists of a resistor 26 and capacitor 27 in parallel both in series with a single resistor 28 followed by a buffer amplifier 29. This design and arrangement is such that the voltage appearing at the output 11" of the compensator 16" leads in phase over a designated frequency range compared to the input 30. This output 11" of the compensator 16" is transmitted to and provides a voltage to the input of the actuator 11 which in turn positions the control surface of the aircraft 10 accordingly. Thus it is the addition of the dynamics of the compensator 16" to the total pilot 12 mechanism 11/aircraft 10 combination which increases the fidelity between the actual and desired attitude of the aircraft 10, resulting in improved handling qualities of the aircraft 10 from the pilot's viewpoint.

While the invention has been hereinabove illustrated and described in what is believed to be its best and most practical form under present-day conditions, it is recognized that under other conditions this form would be modified. No attempt has been made to specifically incorporate any such other forms in this disclosure in the interest of clarity of the total inventive concept. The claims are relied upon to cover these other forms generally.

What is claimed is:

1. In combination with the control system of a vehicle having an adjustable directional control element, an actuating mechanism for said control element and a controller operable by the driver of said vehicle for the selected movement of said mechanism whereby said control element is adjusted and the direction of movement of said vehicle effected accordingly, a compensator, pre-set with dynamic motion characteristics essentially equal to and opposite from the inherent undesirable dynamic motion characteristics of said vehicle over a preselected operating range operably connected to said mechanism and actuated by movement of said controller at a predetermined motion different from that of said controller at all times during movement of said controller whereby the inherent undesirable dynamic motion characteristics of said vehicle are substantially negated.

2. The combination of claim 1 wherein said vehicle is an aircraft and said adjustable directional control element is an external surface.

3. The combination of claim 1 wherein said compensator includes first means operatively connected to said controller for adjustment thereby and second means operable in response to the adjustment aforesaid whereby the movement of said controller and said control element are time-related in a predetermined sequence.

4. The combination of claim 3 wherein said compensator is hydro-mechanical, said first means includes at least one linear valve and said second means includes at least one hydraulic actuator.

5. The combination of claim 3 wherein said compensator is electrical, said first means includes a voltage detector, said second means includes a resistor and capacitor in parallel both in series with a resistor followed by an amplifier.

6. The combination of claim 3 wherein said first means includes a single linear valve directly connected to said controller and said second means includes a single hydraulic actuator directly connected to said actuating mechanism.

7. The combination of claim 3 wherein said first means includes a single linear valve, said second means includes a single hydraulic actuator, and including a direct connection between said controller and both said linear valve and said hydraulic actuator, and including a direct connection between said hydraulic actuator and said control element actuating mechanism.

8. The combination of claim 3 wherein said first means includes a single linear valve, said second means includes a single hydraulic actuator, and including a direct connection between said controller and both said linear valve and said hydraulic actuator, and including a direct connection between said linear valve and said control element actuating mechanism.

9. The combination of claim 3 wherein said first means includes a single linear valve, said second means includes a single hydraulic actuator, and including a direct connection between said controller and both said linear valve and said hydraulic actuator, and further including a direct connection between said controller and said control element actuating mechanism.

10. The combination of claim 3 wherein said first means includes a pair of linear valves and said second means includes a pair of hydraulic actuators, and including a direct connection between said controller and both each said linear valves and each said hydraulic actuator, a direct connection between the linear valve associated with one of said hydraulic actuators and said control element actuating mechanism, and a direct connection between the other of said hydraulic actuators and said control element actuating mechanism.

* * * * *

UNITED STATES PATENT AND TRADEMARK OFFICE
CERTIFICATE OF CORRECTION

PATENT NO. : 4,071,209
DATED : January 31, 1978
INVENTOR(S) : JOHN EVANS HART

It is certified that error appears in the above-identified patent and that said Letters Patent are hereby corrected as shown below:

In FIGURE 1 of the drawings the word "ALTITUDE", appearing adjacent the reference character 14, should read --ATTITUDE--.

Column 1, line 57 after the word "be" and before the question mark --relaxed-- should be added.

Signed and Sealed this

Ninth Day of May 1978

[SEAL]

Attest:

RUTH C. MASON
Attesting Officer

LUTRELLE F. PARKER
Acting Commissioner of Patents and Trademarks